J. P. NEWBOLD.
Ball-Target.
No. 222,301.   Patented Dec. 2, 1879.
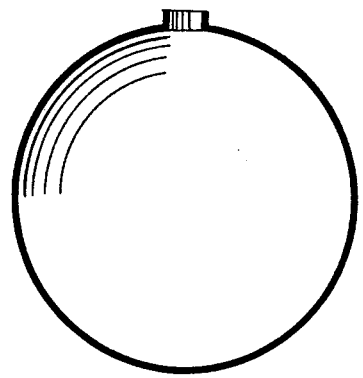
WITNESSES.   INVENTOR.

UNITED STATES PATENT OFFICE

J. PEMBERTON NEWBOLD, OF PHILADELPHIA, PENNSYLVANIA.

IMPROVEMENT IN BALL-TARGETS.

Specification forming part of Letters Patent No. 222,301, dated December 2, 1879; application filed April 21, 1879.

*To all whom it may concern:*

Be it known that I, J. PEMBERTON NEWBOLD, of the city and county of Philadelphia, and State of Pennsylvania, have invented a new and useful Improvement in Balls for the Purpose of Target-Shooting, of which the following is a specification.

It has been common to use glass balls for target-shooting. The balls are thrown into the air and are broken either by the shot or by striking the ground. In either case the broken pieces remain a source of danger to cattle, men, and crops.

Attempts have been made to overcome this difficulty by substituting hollow balls made from plaster-of-paris, cement, or other similar substances. While the balls so constructed have avoided the difficulty existing in the use of ordinary glass balls, they have proved unfit for shooting purposes from another reason. They absorb moisture readily, and, except when perfectly dry—a condition which can be very rarely secured in actual use—they are not broken by the shot.

My invention consists in the manufacture of balls for this purpose from materials that possess the required strength, the vitreous fracture and brittleness of glass, combined with the properties (not possessed by ordinary glass) of solubility or easy destructibility by exposure to atmospheric influences. The fragments of the ball on the ground will in a short time be dissolved, disintegrated, or so altered by the weather as to be no longer injurious, although the ball itself, even when exposed to moisture, preserves its brittle quality.

The accompanying drawing gives a sectional view of my ball constructed, as I prefer, with a small neck, A, to attach it to the spring from which it is thrown into the air.

For making these balls I use the soluble silicates of soda or potassa, or a mixture of the soluble silicates of both alkalies, known as "soluble glass."

The above-mentioned soluble silicates are well known in commerce, and the process of manufacturing the balls therefrom is similar to the well-known method of blowing balls from ordinary glass.

I find it useful to add to the above-named silicates, when in fusion, a small percentage of soda carbonate or hydrate, to render the solution of the alkaline silicates more complete in cases where it is interfered with by the dissolving of the alkali in the melting-pot when attacked by the alkaline silicates.

I claim—

A ball-target composed of silicates of soda or potassa, or their equivalents, substantially as described, and for the purpose set forth.

J. P. NEWBOLD.

Witnesses:
 S. S. HOLLINGSWORTH,
 JOHN ROBERTS.